(12) United States Patent
Zhang (10) Patent No.: US 11,113,140 B2
(45) Date of Patent: Sep. 7, 2021

(54) DETECTING ERROR IN EXECUTING COMPUTATION GRAPH ON HETEROGENEOUS COMPUTING DEVICES

(71) Applicant: ALIBABA GROUP HOLDING LIMITED, Grand Cayman (KY)

(72) Inventor: Weifeng Zhang, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 157 days.

(21) Appl. No.: 16/416,726

(22) Filed: May 20, 2019

(65) Prior Publication Data

US 2020/0371856 A1 Nov. 26, 2020

(51) Int. Cl.
*G06F 11/00* (2006.01)
*G06F 11/07* (2006.01)
*G06F 9/46* (2006.01)

(52) U.S. Cl.
CPC ............ *G06F 11/079* (2013.01); *G06F 9/461* (2013.01); *G06F 11/0709* (2013.01); *G06F 11/0751* (2013.01)

(58) Field of Classification Search
CPC . G06F 11/0709; G06F 11/0751; G06F 11/079
See application file for complete search history.

(56) References Cited

U.S. PATENT DOCUMENTS

| | | | |
|---|---|---|---|
| 2019/0087497 A1* | 3/2019 | Chan | G06F 16/955 |
| 2019/0376906 A1* | 12/2019 | Koo | G01N 21/88 |
| 2020/0167207 A1* | 5/2020 | Brevdo | G06F 9/4806 |

* cited by examiner

*Primary Examiner* — Charles Ehne
(74) *Attorney, Agent, or Firm* — Finnegan, Henderson, Farabow, Garrett & Dunner, LLP (57) ABSTRACT

The present disclosure relates to a method for detecting error in executing a computation graph on heterogeneous computing devices. The method comprises receiving a first reference value as an execution result for a first node of the computation graph from a reference device included in the heterogeneous computing devices, receiving a first target value from a target device included in the heterogeneous computing devices as an execution result by the target device for the first node, comparing the first reference value and the first target value, and determining whether the first target value is in error based on the comparison of the first reference value and the first target value. The method can further comprise generating multiple execution contexts for executing the computation graph on the heterogeneous computing devices.

21 Claims, 6 Drawing Sheets

DETECTING ERROR IN EXECUTING COMPUTATION GRAPH ON HETEROGENEOUS COMPUTING DEVICES

BACKGROUND

In machine learning or deep learning, a neural network model may be graphically represented by a computational graph or a data structure comprising nodes and edges organized as a directed acyclic graph (DAG). Nodes represent variables or computation operations, while edges represent data or tensor flow from one node to another. A node representing a computation operation can consume input data flowing in along an incoming edge to the node, while output data produced by the computation operation can flow out along an outgoing edge from the node.

Neural network models have been constantly increasing and becoming more complicated. A typical machine learning or deep learning model may have thousands or even millions of nodes and is usually very large (hundreds of Mbytes). These neural network models are often offloaded onto accelerators for fast execution. However, conventional systems cannot detect and debug errors when executing a neural network model until accelerators finish execution of the entire neural network model.

SUMMARY

Embodiments of the present disclosure provide a method for detecting error in executing a computation graph on heterogeneous computing devices. The method can comprise receiving a first reference value as an execution result for a first node of the computation graph from a reference device included in the heterogeneous computing devices, receiving a first target value from a target device included in the heterogeneous computing devices as an execution result by the target device for the first node, comparing the first reference value and the first target value, and determining whether the first target value is in error based on the comparison of the first reference value and the first target value.

Embodiments of the present disclosure also provide a system for detecting error in executing a computation graph on heterogeneous computing devices. The system can comprise heterogeneous computing devices including a reference device and a target device each of which is configured to execute the computation graph and an error detection apparatus. An error detection apparatus can be configured to: receive a first reference value from the reference device as an execution result by the reference device for a first node of the computation graph, receive a first target value from the target device as an execution result by the target device for the first node, compare the first reference value and the first target value, and determine whether the first target value is in error based on the comparison of the first reference value and the first target value.

Embodiments of the present disclosure also provide a non-transitory computer readable medium that stores a set of instructions that is executable by at least one processor of a computing device to cause the computing device to perform a method for detecting error in executing a computation graph on heterogeneous computing devices. The method can comprise receiving a first reference value from a reference device included in the heterogeneous computing devices as an execution result by the reference device for a first node of the computation graph, receiving a first target value from a target device included in the heterogeneous computing devices as an execution result by the target device for the first node, comparing the first reference value and the first target value, and determining whether the first target value is in error based on the comparison of the first reference value and the first target value.

Determining whether the first target value is in error can comprise determining whether a difference value between the first reference value and the first target value is within a pre-set threshold value. The method can further comprise, in response to the determination that the difference value between the first reference value and the first target value is not within the pre-set threshold value, classifying the first node corresponding to the target device as a node that has an error. After completion of execution of the first node, execution of the computation graph by the target device can be suspended until the classification of the first node is completed. After the classification of the first node is completed, execution of the computation graph by the target device can be resumed.

The method can further comprise receiving a second reference value from the reference device as an execution result by the reference device for a second node of the computation graph, receiving a second target value from the target device as an execution result by the target device for the second node, wherein the second target value is obtained by executing the second node using the first reference value as an execution result for the first node, comparing the second reference value and the second target value, and determining whether the second target value is in error based on the comparison between the second reference value and the second target value. The method can further comprise generating a reference execution context for executing the computation graph on the reference device and a target execution context for executing the computation graph on the target device.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

There are scenarios where debugging and verifying execution of neural network models represented by computation graphs is required when executing these neural network models on accelerators. A first scenario is when designing a new accelerator. A new hardware accelerator, generally, has insufficient or no logic to support debugging or verifying execution of computation graphs due to its simplified or limited hardware resources. Further, it is challenging and time consuming to locate errors if the execution result is incorrect after executing the entire computation graph on the new accelerator, specially, during an early designing or debugging phase. A second scenario is when porting an existing machine learning model to an accelerator, for example, in a heterogeneous computing architecture. It is often required to verify and debug runtime execution by the accelerator to make sure that expected execution results are obtained from the runtime execution.

A typical machine learning or deep learning model may have thousands or even millions of nodes, for example, associated with a computation graph. As a machine learning model becomes more complicated, identifying locations of error nodes in a computation graph representing the machine learning model becomes more difficult. The disclosed embodiments can provide methods and apparatus for identifying failure in execution of a computation graph when executing the computation graph on accelerators, especially, in a heterogeneous platform. The disclosed embodiments can provide techniques for quickly identifying where, if any, errors occur after a single run of a computation graph on computing devices. Therefore, according to embodiments of the present disclosure, debugging and verifying a design of a new accelerator can be expedited by pinpointing error nodes in the computation graph. The disclosed embodiments can keep computation resources from being consumed for redundant computation. In-place result comparison according to embodiments of the present disclosure enables to automatically identify errors in execution of a computation graph on computing devices.

Figure 1:
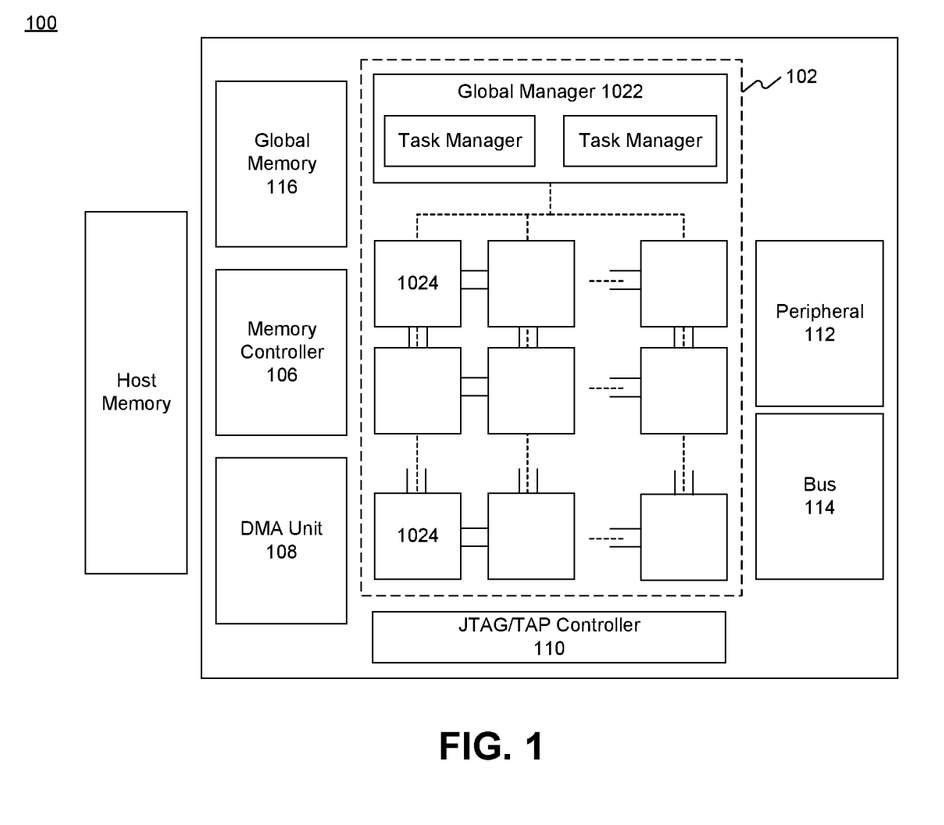
FIG. 1 illustrates an exemplary neural network accelerator architecture, consistent with embodiments of the present disclosure.

FIG. 1 illustrates an exemplary neural network accelerator architecture 100, consistent with embodiments of the present disclosure. In the context of this disclosure, a neural network accelerator may also be referred to as a machine learning accelerator or deep learning accelerator. In some embodiments, accelerator architecture 100 may be referred to as a neural network processing unit (NPU) architecture 100. As shown in FIG. 1, accelerator architecture 100 can include an on-chip communication system 102, a host memory 104, a memory controller 106, a direct memory access (DMA) unit 108, a Joint Test Action Group (JTAG)/Test Access End (TAP) controller 110, peripheral interface 112, a bus 114, a global memory 116, and the like. It is appreciated that on-chip communication system 102 can perform algorithmic operations based on communicated data. Moreover, accelerator architecture 100 can include a global memory 116 having memory blocks (e.g., 4 blocks of 8 GB second generation of high bandwidth memory (HBM2)) to serve as main memory.

On-chip communication system 102 can include a global manager 1022 and a plurality of cores 1024. Global manager 1022 can include at least one task manager to coordinate with one or more cores 1024. Each task manager can be associated with an array of cores 1024 that provide synapse/neuron circuitry for the neural network. For example, the top layer of cores of FIG. 1 may provide circuitry for executing a first layer of a neural network, while the second layer of cores may provide circuitry for executing a second layer of the neural network. As shown in FIG. 1, global manager 1022 can include two task managers to coordinate with two arrays of cores 1024.

Cores 1024 can include one or more processing elements that each includes single instruction, multiple data (SIMD) architecture including one or more processing units configured to perform one or more operations (e.g., multiplication, addition, multiply-accumulate, etc.) on the communicated data under the control of global manager 1022. To perform the operation on the communicated data packets, cores 1024 can include one or more processing elements for processing information in the data packets. Each processing element may comprise any number of processing units. In some embodiments, core 1024 can be considered a tile or the like.

Host memory 104 can be off-chip memory such as a host CPU's memory. For example, host memory 104 can be a double data rate synchronous dynamic random-access memory (e.g., DDR SDRAM) or the like. Host memory 104 can be configured to store a large amount of data with slower access speed, compared to the on-chip memory integrated within one or more processors, acting as a higher-level cache.

Memory controller 106 can manage the reading and writing of data to and from a specific memory block (e.g., HBM2) within global memory 116. For example, memory controller 106 can manage read/write data coming from an external chip communication system 102 (e.g., from DMA unit 108 or a DMA unit corresponding with another accelerator) or from on-chip communication system 102 (e.g., from a local memory in core 1024 via a 2D mesh controlled by a task manager of global manager 1022). Moreover, while one memory controller is shown in FIG. 1, it is appreciated that more than one memory controller can be provided in accelerator architecture 100. For example, there can be one memory controller for each memory block (e.g., HBM2) within global memory 116.

Memory controller 106 can generate memory addresses and initiate memory read or write cycles. Memory controller 106 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of memory controllers.

DMA unit 108 can assist with transferring data between host memory 104 and global memory 116. In addition, DMA unit 108 can assist with transferring data between multiple accelerators. DMA unit 108 can allow off-chip devices to access both on-chip and off-chip memory without causing a host CPU interrupt. Thus, DMA unit 108 can also generate memory addresses and initiate memory read or write cycles. DMA unit 108 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that accelerator architecture 100 can include a second DMA unit, which can be used to transfer data between other accelerator architecture to allow multiple accelerator architectures to communicate directly without involving the host CPU.

JTAG/TAP controller 110 can specify a dedicated debug port implementing a serial communications interface (e.g., a JTAG interface) for low-overhead access to the accelerator without requiring direct external access to the system address and data buses. JTAG/TAP controller 110 can also have on-chip test access interface (e.g., a TAP interface) that implements a protocol to access a set of test registers that present chip logic levels and device capabilities of various parts.

Peripheral interface 112 (such as a PCIe interface), if present, serves as an (and typically the) inter-chip bus, providing communication between the accelerator and other devices.

Bus 114 includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. Typically, if there is a peripheral interface 112 (e.g., the inter-chip bus), bus 114 is solely concerned with intra-chip buses, though in some implementations it could still be concerned with specialized inter-bus communications.

While accelerator architecture 100 of FIG. 1 is generally directed to an NPU architecture (as further described below), it is appreciated that the disclosed embodiments may be applied to any type of accelerator for accelerating some applications such as deep learning. It is also appreciated that the disclosed embodiments can be applied to any accelerator such as a chip with SIMD architecture. Such accelerators can be, for example, GPU (Graphics Processing Unit), FPGA (Field Programmable Gate Array), ASIC (Application Specific Integrated Circuit) with vector or matrix processing ability, or other types of neural network accelerators for deep learning. SIMD or vector architecture is commonly used to support computing devices with data parallelism, such as graphics processing and deep learning. The SIMD architecture can include multiple processing elements, wherein each of the processing elements can perform the same operation on multiple data points simultaneously.

Figure 2:
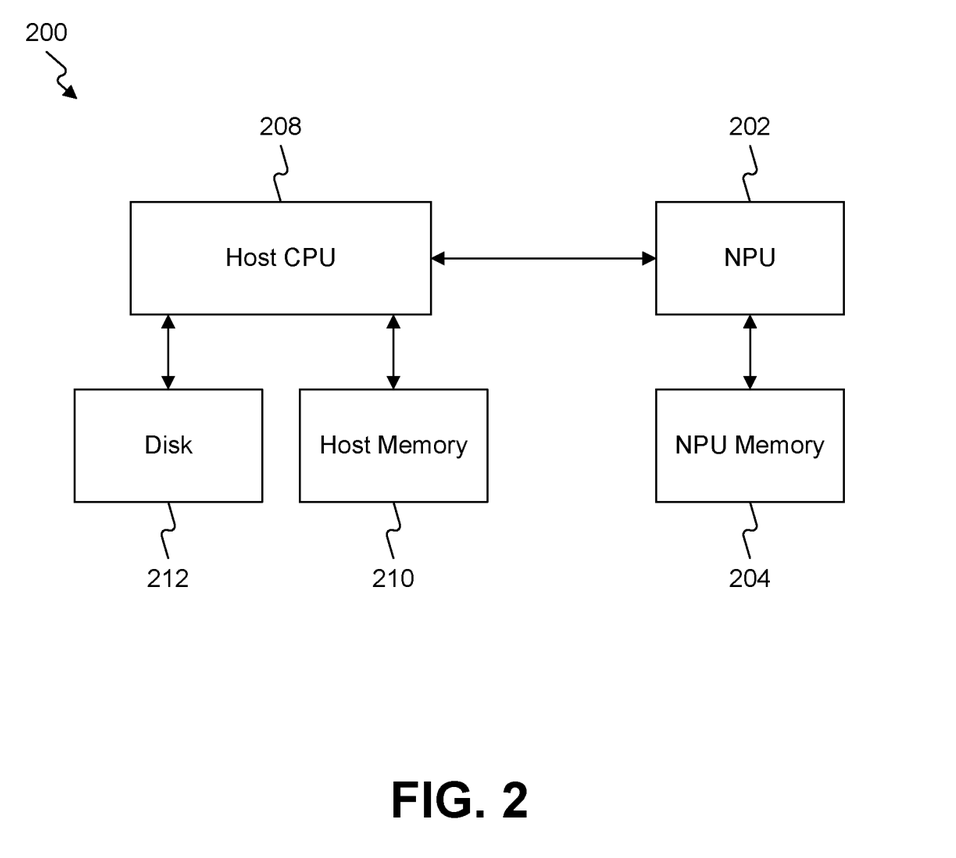
FIG. 2 illustrates an exemplary neural network accelerator system, consistent with embodiments of the present disclosure.

Reference is now made to FIG. 2, which illustrates a block diagram of an exemplary neural network accelerator system 200, consistent with embodiments of the present disclosure. Neural network accelerator system 200 may include a neural network processing unit (NPU) 202, an NPU memory 204, a host CPU 208, a host memory 210 associated with host CPU 208 (which may correspond to host memory 104 of FIG. 1), and a disk 212.

As illustrated in FIG. 2, NPU 202 may be connected to host CPU 208 through a peripheral interface (e.g., peripheral interface 112 of FIG. 1). As referred to herein, a neural network processing unit (e.g., NPU 202) may be a computing device for accelerating neural network computing tasks. In some embodiments, NPU 202 may be configured to be used as a co-processor of host CPU 208.

In some embodiments, NPU 202 may comprise a compiler (not shown). The compiler is a program or computer software that transforms computer code written in one programming language into NPU instructions to create an executable program. In machining applications, a compiler can perform a variety of operations, for example, preprocessing, lexical analysis, parsing, semantic analysis, conversion of input programs to an intermediate representation, code optimization, and code generation, or combinations thereof.

In some embodiments, the compiler may be on a host unit (e.g., host CPU 208 or host memory 210 of FIG. 2), configured to push one or more commands to NPU 202. Based on these commands, a task manager (e.g., task manager 102 of FIG. 1) may assign any number of tasks to one or more cores or processing elements (for simplicity, cores shall be referred to hereinafter although the core can include multiple processing elements or be separate from processing elements). Some of the commands may instruct a DMA unit (e.g., DMA unit 108 of FIG. 1) to load instructions and data from host memory (e.g., host memory 104 of FIG. 1) into a global memory. The loaded instructions may then be distributed to each core (e.g., core 1024 of FIG. 1) assigned with the corresponding task, and the one or more cores may process these instructions.

It is appreciated that the first few instructions received by the core may instruct the core to load/store data from the global memory into one or more local memories of the core (e.g., a memory of the core or a local memory for each active core). Each core may then initiate the instruction pipeline, which involves fetching the instruction (e.g., via a fetch unit) from the local memory, decoding the instruction (e.g., via an instruction decoder) and generating local memory addresses (e.g., corresponding to an operand), reading the source data, executing or loading/storing operations, and then writing back results.

Host CPU 208 may be associated with host memory 210 and disk 212. In some embodiments, host memory 210 may be an integral memory or an external memory associated with host CPU 208. Host memory 210 may be a local or a global memory. In some embodiments, disk 212 may comprise an external memory configured to provide additional memory for host CPU 208.

Figure 3:
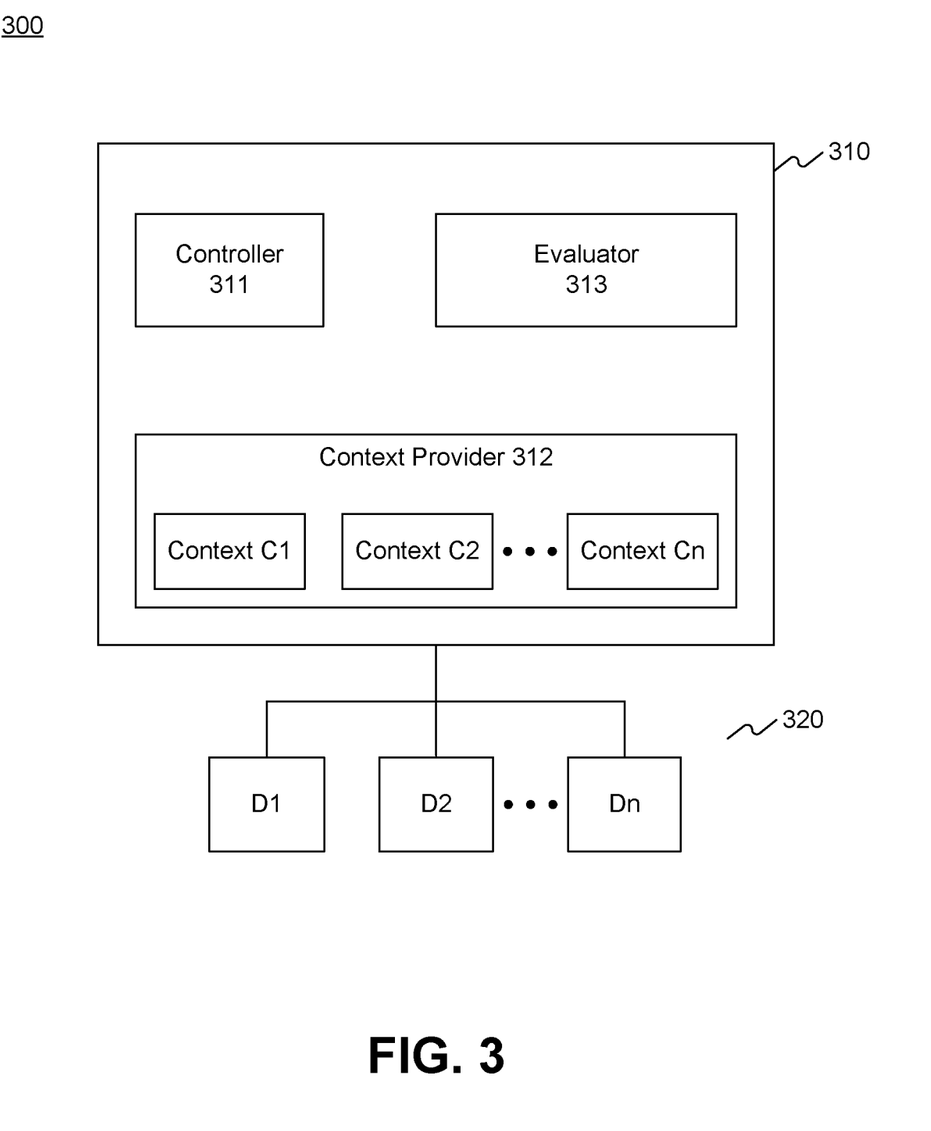
FIG. 3 illustrates a system for detecting errors in execution of a computation graph, consistent with embodiments of the present disclosure.

FIG. 3 illustrates a system 300 for detecting errors in execution of a computation graph, consistent with embodiments of the present disclosure. The system 300 for detecting errors in execution of a computation graph may include an error detection apparatus 310 and heterogeneous computing devices 320. According to embodiments of the present disclosure, heterogeneous computing devices 320 may include a plurality of computing devices D1 to Dn. In some embodiments, heterogeneous computing devices 320 may include a plurality of computing devices D1 to Dn that may not have equal processing performance. In some embodiments, at least two of the plurality of computing devices D1 to Dn may have different architecture with each other. In some embodiments, computing devices D1 to Dn can be implemented as any one of CPU, GPU, FPGA, ASIC, etc. In some embodiments, at least two of the plurality of computing devices D1 to Dn may have different processing speeds, power consumptions, transfer costs, etc. In some embodiments, a certain computing device may be configured to be specialized to process a certain operation with high performance such as low cost and high accuracy. In some embodiments, the computing devices D1 to Dn can be accelerators having, for example, the accelerator architecture 100 of FIG. 1. In some embodiments, the heterogeneous computing devices 320 may include one computing device in which processing elements do not have equal processing performance.

As shown in FIG. 3, error detection apparatus 310 can include a controller 311, a context provider 312, and an evaluator 313, consistent with embodiments of the present disclosure.

Controller 311 can be configured to dispatch a computation graph representing a neural network model for execution onto at least two computing devices among the plurality of computing devices D1 to Dn, consistent with embodiments of the present disclosure. In some embodiments, a computation graph can be generated from source code for the neural network model, for example, by a compiler. In some embodiments, a computation graph can be generated by transforming a machine-learning model or neural network model written in high level language. In some embodiments, a computation graph can be generated from another high-level code initially compiled from the source code. In some embodiments, the machine-learning model may be a trained frozen machine-learning model. In some embodiments, the computation graph can be in a form of a Directed Acyclic Graph (DAG) generated by parsing a machine-learning model. In computation graphs, nodes represent variables or computation operations, while edges represent data or tensor flow from one node to another. A node representing a computation operation can consume input data flowing in along an incoming edge to the node, while output data produced by the computation operation can flow out along an outgoing edge from the node.

Figure 4:
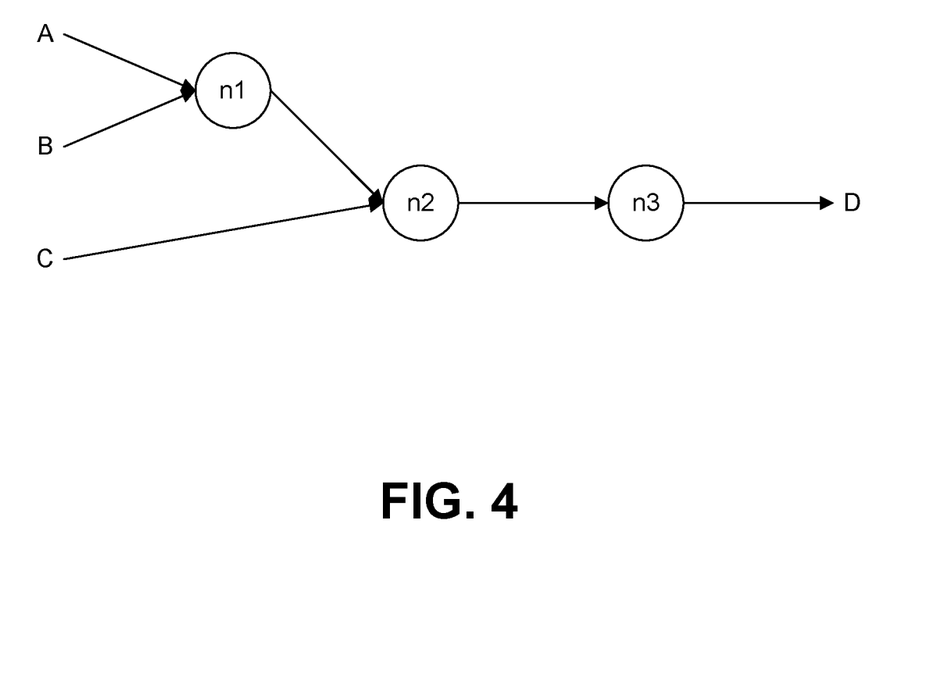
FIG. 4 illustrates an example of a computation graph representing a neural network model.

An example of a computation graph to be dispatched by controller 311 is illustrated in FIG. 4. As shown in FIG. 4, a computation graph includes a plurality of nodes n1 to n3 and edges connecting two nodes among the plurality of nodes n0 to n3. Also, edges connect input data "A," "B," and "C" to corresponding nodes n1 and n2. A first node n1 receives input data "A" and "B" as inputs and its output is provided to a second node n2. In turn, the second node n2 receives the output of the first node n1 and input data "C" as inputs and its output is provided to a third node n3. The third node n3 receives the output of the second node n2 as an input and outputs output data "D." It should be noted that the computation graph of FIG. 4 is explanatory only and not restrictive, and thus embodiments of the present disclosure can be applied to a computation graph having any number of nodes and edges. In some embodiments, some nodes n1 to n3 can include information such as a type of operation, dimensions of data structure, input node(s), output node(s), etc. Here, the operation may include a convolution (Cony), ReLU, multiplication (MatrixMul), etc. In some embodiments, some other nodes may be non-operational nodes and can include weights and other parameters such as constants. In some embodiments, any of input data "A," "B," or "C" or output data "D" can be treated as a node. Edges can represent dependency between two nodes connected by the corresponding edge. That is, a node at the end point of the edge can be processed only after a process of a node at the start point of the edge is completed. For example, a second node n2 can be processed only after a first node n1 is processed and the output of the first node 1 is provided to the second node n2.

Referring back to FIG. 3, in some embodiments, a computation graph can be dispatched by controller 311 as a set of instructions that is executable by computing devices D1 to Dn. In some embodiments, a set of instructions for a computation graph can be generated by controller 311. In some embodiments, a set of instructions for a computation graph can be generated by another device or component such as a compiler, and controller 311 can receive the set of instructions from the other device or component. In some embodiments, controller 311 can acquire a set of instructions of a computation graph from a memory or database storing the set of instructions. In some embodiments, controller 311 can be configured to dispatch a set of instructions for a computation graph to computing devices D1 to Dn when a request is received.

In some embodiments, controller 311 can be further configured to monitor and supervise processes performed by an error detection device 300 as well as execution of a computation graph by computing devices D1 to Dn. For example, controller 311 can coordinate timing for execution of a computation graph by computing devices D1 to Dn by monitoring or learning processes performed by an error detection device 300, which will be explained in detail where relevant.

Context provider 312 can have execution context for executing a computation graph within a runtime system, consistent with embodiments of the present disclosure. In some embodiments, execution context for executing a computation graph within a runtime system can have information regarding a runtime environment such as hardware architecture of the runtime system, availability of one or more resources including processing resources and memory resources of the runtime system during execution of the computation graph, etc. In some embodiments, execution context for executing a computation graph within a runtime system can have information regarding nodes in a computation graph such as what kind of operation a node represents, where the operation represented by the node is processed, where input data for the node is stored, where output data of the node is forwarded and saved, etc. In some embodiments, a runtime system can be a neural network accelerator system comprising heterogeneous computing devices 320.

As shown in FIG. 3, context provider 312 can have a plurality of execution contexts C1 to Cn for executing a computation graph on at least two computing devices among the plurality of computing devices D1 to Dn. For example, a number of execution contexts included in the context provider 312 can be equal to a number of computing devices D1 to Dn to be used for executing a computation graph. When executing a computation graph on two or more computing devices, context provider 312 can have two or more contexts such as C1 to Cn corresponding to the two or more computing devices. For example, a first execution context C1 can include an execution context for executing a computation graph on a first computing device D1, a second execution context C2 can include an execution context for executing the computation graph on a second computing device D2, and so on. Thereby, a computation graph can be scheduled and dispatched to the two or more computing devices D1 to Dn and each node of the computation graph can be simultaneously executed on the two or more computing devices D1 to Dn.

In some embodiments, a plurality of execution contexts C1 to Cn can be created by duplicating context information of one execution context multiple times. Here, context information specific to a certain computing device can vary from one execution context to another because computing devices D1 to Dn can have different hardware structure and available resources from each other. For example, a processing resource assigned to process a certain node of a computation graph can be different in each execution context C1 to Cn, an allocated memory for storing intermediate results of a certain node can be different in each execution context C1 to Cn, etc.

In some embodiments, context provider 312 can share some resources among multiple execution contexts C1 to Cn to improve runtime efficiency. For example, a memory space for storing input data can be shared by multiple execution contexts C1 to Cn by using a pointer to the memory space in the multiple execution contexts C1 to Cn instead of copying the input data to another memory space for each execution contexts C1 to Cn. Here, the memory space can be a read-only data buffer, for example, associated with a host CPU. In some embodiments, one execution context (e.g., C1) can include a data buffer for storing data input and the other execution contexts (e.g., C2 to Cn) can share the data buffer by using a pointer to the data buffer instead of copying the data input to their own data buffers.

By contrast, in some embodiments, multiple execution contexts C1 to Cn can use different resources for storing execution results of a certain node from each other. For example, a first execution context C1 and a second execution context C2 can have a different memory space from each other for storing execution results for a first node n1 of a computation graph. In some embodiments, one execution context (e.g., C1) can include a data buffer for storing execution result of a first node n1 and the other execution contexts (e.g., C2 to Cn) can include their own data buffers for storing execution results of the first node n1. In this way, data overwriting by multiple execution results from multiple computing devices D1 to Dn to a same memory space can be avoided.

Evaluator 313 is configured to receive execution results from two or more computing devices of a computation graph, consistent with embodiments of the present disclosure. Here, two or more computing devices among a plurality of computing devices D1 to Dn can execute a computation graph and execution results per node from each of the two or more computing devices D1 to Dn can be forwarded to evaluator 313. According to embodiments of the present disclosure, evaluator 313 is configured to determine whether there is an error per node of a computation graph with respect to each computing device for executing the computation graph. In some embodiments, one computing device (e.g., D1) among the two or more computing devices simultaneously executing a computation graph can be used as a reference device that is assumed to produce correct results when executing the computation graph. Here, the rest of the computing devices (e.g., D2 to Dn) can be used as target devices to be verified regarding whether their results are correct or not. In some embodiments, evaluator 313 is configured to determine whether execution results from the target devices are erroneous by comparing the execution results with execution result from the reference device. In some embodiments, a reference device can be determined as producing correct results when executing a computation graph, for example, based on prior experiments, simulations, error detecting and debugging processes, etc.

Although an error detection process will be explained by assuming that two computing devices are used to execute a computation graph, it is appreciated that the present disclosure can also be applied to three or more computing devices executing a computation graph simultaneously. Here, it is assumed that a first computing device D1 is used as a reference device and a second computing device D2 is a target device of which results are evaluated to determine whether there are errors or not. In some embodiments, a CPU can be used as a reference device and any type of accelerator or computing device to be verified can be a target device. While a reference device and a target device can be implemented within an integral hardware device in some embodiments, it is also possible that a reference device and a target device are implemented separately and communicate independently with an error detection apparatus 310.

Figure 5:
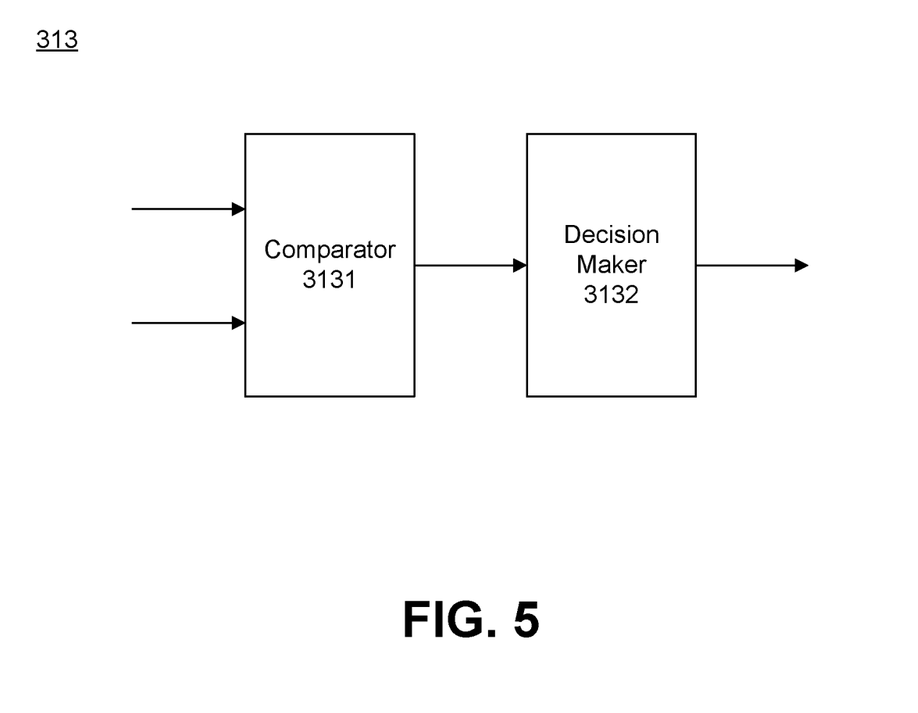
FIG. 5 illustrates a block diagram of exemplary components of an evaluator, consistent with embodiments of the present disclosure.

FIG. 5 illustrates a block diagram of exemplary components of an evaluator, consistent with embodiments of the present disclosure. Evaluator 313 can include a comparator 3131 and a decision maker 3132, consistent with embodiments of the present disclosure.

Comparator 3131 is configured to receive execution result values per node of a computation graph from two or more computing devices D1 to Dn and to compare the execution result values. For illustration purposes only, a computation graph representing a neural network model shown in FIG. 4 is executed by a reference device D1 and a target device D2 for verifying the target device D2. It is appreciated that the present disclosure can be applied to any other type of neural network models. For example, comparator 3131 can receive a first reference value from a reference device D1 as an execution result by the reference device D1 for a first node n1 of a computation graph and a first target value from a target device D2 as an execution result by the target device D2 for the first node n1 after a first node n1 of a computation graph is executed by the reference device D1 and the target device D2, respectively. In some embodiments, comparator 3131 can wait until a first reference value and a first target value for a first node n1 from both of the reference device D1 and the target device D2 are inputted to the comparator 3131 because execution time of the reference device D1 and the target device D2 can be different from each other. In some embodiments, comparator 3131 is configured to compare the first reference value and the first target value for a first node n1 received from a reference device D1 and a target device D2. In some embodiments, a comparison result for the first node n1 of the computation graph can be provided to a decision maker 3132. In some embodiments, the comparison result can be a difference value between the first reference value and the first target value.

According to some embodiments of the present disclosure, decision maker 3132 is configured to determine whether a first target value of a first node n1 from a target device D2 is erroneous or not based on the comparison result received from a comparator 3131. In some embodiments, decision maker 3132 can determine a first target value for a first node n1 is in error when the comparison result does not meet a criterion for determining an error. In some embodiments, a criterion for determining an error can be that a difference value as the comparison result is within a threshold value. For example, decision maker 3132 can determine that a first target value for a first node n1 is not erroneous (or correct) when the difference value is within a pre-set threshold value, and determine that the first target value for the first node n1 is in error (or not correct) when the difference value is bigger than the pre-set threshold value. It will be appreciated that a threshold value can have a value larger than "0" because computing devices can have different computation accuracy. It is understood that a threshold value can vary depending on embodiments of the present disclosure.

In some embodiments, after decision maker 3132 determines whether the first target value is in error or not, the decision can be notified to a system 300 or to a remote device such as a server (not shown). In some embodiments, the decision can be notified to a controller 311. In some embodiment, when the first target value for a first node n1 is determined in error, a first node execution of a target device D2 can be indicated that there is an error. Consistent with embodiments of the present disclosure, execution of the computation graph by the reference device D1 and the target device D2 can be suspended until a decision by the evaluator 313 about whether the first target value for a first node n1 is in error or not is made. In some embodiments, a controller 311 is configured to suspend the execution of the computation graph by the reference device D1 and the target device D2 during a time period from receiving the first reference value and first target value for a first node n1 to receiving a notification of the decision whether the first node n1 is in error or not. In some embodiments, a controller 311 can monitor processes performed by an evaluator 313 and can be configured to suspend the execution of the computation graph until decision or classification whether the first node n1 is in error or not is made based on the monitoring. In some embodiments, the reference device D1 and the target device D2 can resume executing a second node n2 of a computation graph after a decision about a first node n1 is made and notified. In some embodiments, a controller 311 can be configured to instruct the reference device D1 and target device D2 to resume the execution. In some embodiments, a controller 311 is configured to determine timing of execution by the reference device D1 and target device D2 by considering progress of processes performed by context provider 312 and an evaluator 313.

As shown in FIG. 4, it is noted that an output result from executing operation(s) associated with a first node n1 is consumed for executing operation(s) associated with a second node n2 in addition to input data "C." In some embodiments, both of the reference device D1 and the target device D1 can use a first reference value from the reference device D1 as an execution result for a first node n1 regardless of a decision made by evaluator 310 in that it is assumed that the reference device D1 produces correct execution results for the computation graph. By making a target device D2 use a first reference value as an execution result for a first node n1 when executing subsequent nodes, it is assured that subsequent results from the target device D2 are not affected by erroneous results from previous nodes' execution by the target device D2, which is an object to be verified. In some embodiments, the target device D2 can use a first reference value as an execution result for a first node n1 from the reference device D1 when the evaluator 310 determines that the first target value is in error, and the target device D2 can use a first target value as an execution result of a first node n1 from the target device D2 when the evaluator 310 determines the first target value is not erroneous.

Similarly, evaluator 313 can receive, from a reference device D1, a second reference value for a second node n2 of a computation graph and, from a target device D2, a second target value for the second node n2 of the computation graph, consistent with embodiments of the present disclosure. According to embodiments of the present disclosure, evaluator 313 can determine a second target value for a second node n2 of a computation graph from a target device D2 in a similar manner as illustrated with respect to a first node n1. In some embodiments, after decision maker 3132 determines whether the second target value for a second node n2 is in error or not, the decision can be notified to a system 300 or to a remote device such as a server. In some embodiments, the decision can be notified to a controller 311. Similarly, when the second target value for a second node n2 is determined in error, a second node execution by a target device D2 can be indicated in error. Consistent with embodiments of the present disclosure, execution of the computation graph by the reference device D1 and the target device D2 can also be suspended until the decision process by the evaluator 313 regarding whether the second target value for a second node n2 is in error or not is completed. Then, the reference device D1 and the target device D2 can resume executing a subsequent node, e.g., a third node n3 after a decision regarding a second node n2 is made.

Similarly, an error detection process for a third node n3 can be performed as explained regarding a first node n1 and a second node n2. In this example, a third node n3 is a last node and therefore the error detection process can end. In some embodiments, an error detection process can continue until there exists no unexecuted nodes left in a computation graph. In some embodiments, an error detection process may end at a pre-set node in a computation graph depending on a status of hardware accelerator development or on embodiments.

Although an error detection process has been illustrated in a scenario where one computing device (e.g., a second computing device D2) is a target device to be verified, it will be appreciated that an error detection process according to embodiments of the present disclosure can be applied to simultaneously verify multiple computing devices based on execution results from a reference device (e.g., a first computing device D1). For example, a first computing device D1 can be used as a reference device and a second and third computing devices D2 and D3 can be used as target devices to be verified. In this example, evaluator 313 can be configured to compare an execution result for a certain node from the first computing device D1 with each of execution results for the certain node from the second and third computing devices D2 and D3, and to determine each of execution results for the certain node from the second and third computing devices D2 and D3 is in error or not. In some embodiments, evaluator 313 can be implemented to include multiple comparators 3131 corresponding to the number of target devices to be verified. In some embodiments, comparator 3131 and decision maker 3132 in the evaluator 313 can sequentially make decisions whether there is an error for multiple target devices without having multiple comparators. Similarly, embodiments of the present disclosure can be applied to scenarios where there are three or more target devices to be verified.

Embodiments of the present disclosure enable detecting errors for two or more target devices concurrently. Embodiments of the present disclosure also enable identifying error locations in a computation graph through a single execution of the computation graph by a target device. Embodiments of the present disclosure provide a simultaneous execution and comparison scheme to identify nodes producing error execution results node by node by duplicating execution contexts without suffering substantial overhead. According to embodiments of the present disclosure, error nodes of a computation graph can be detected with a single run of the computation graph on a target computing device to be verified or debugged. The present disclosure can also be applied to improve security and safety on heterogeneous computing architecture by using a simultaneous computation and comparison scheme.

Figure 6:
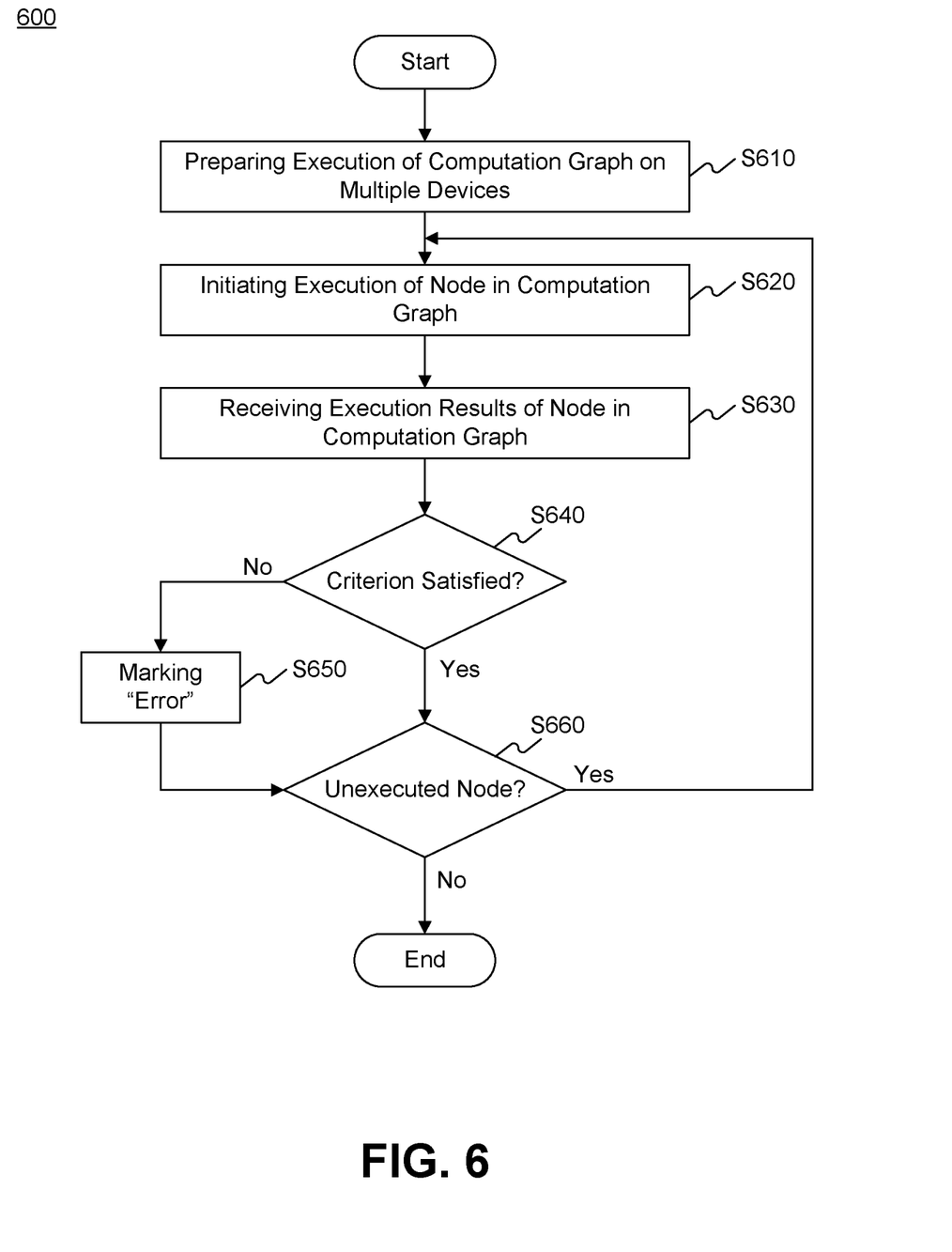
FIG. 6 illustrates an exemplary flow diagram of an error detection method on accelerators, consistent with embodiments of the present disclosure.

FIG. 6 illustrates an exemplary flow diagram of an error detection method on accelerators, consistent with embodiments of the present disclosure. While an error detection method will be explained in a scenario where two computing devices are used to execute a computation graph referring to FIG. 6, it will be appreciated that the present disclosure can also be applied to three or more computing devices execute a computation graph simultaneously. In this scenario, a first computing device D1 is used as a reference device and a second computing device D2 is a target device of which results are evaluated to determine whether there are errors or not.

At step S610, a computation graph representing a neural network model can be dispatched onto a reference device D1 and a target device D2 for execution. As shown as an example in FIG. 4, a computation graph can be in a form of a Directed Acyclic Graph (DAG) generated by parsing a machine-learning model. In some embodiments, a computation graph can be dispatched as a set of instructions that is executable by a reference device D1 and a target device D2.

At step S610, execution of a computation graph on multiple computing devices can be also prepared. According to embodiments of the present disclosure, a reference execution context C1 for executing the computation graph on the reference device D1 and a target execution context C2 for executing the computation graph on the target device D2 can be generated. Thereby, a computation graph can be scheduled and dispatched to the two computing devices D1 and D2, and each node of the computation graph can be simultaneously executed on the two computing devices D1 and D2. In some embodiments, execution context for executing a computation graph within a runtime system can have information regarding runtime environment such as hardware architecture of the runtime system, availability of one or more resources including processing resources and memory resources of the runtime system during execution of the computation graph, etc. In some embodiments, execution context for executing a computation graph within a runtime system can have information regarding nodes in a computation graph such as what kind of operation a node represents, where the operation represented by the node is processed, where input data for the node is stored, where output data of the node is forwarded and saved, etc. In some embodiments, a runtime system can be a neural network accelerator system comprising heterogeneous computing devices 320.

At step S620, execution of a first node in a computation graph by a reference device D1 and a target device D2 can be initiated. In some embodiments, a reference device D1 and a target device D2 can start executing a first node of a computation graph by referring to the dispatched computation graph and corresponding execution context. In some embodiments, execution by a reference device D1 and a target device D2 can be initiated, for example, by an error detection apparatus 310 proving corresponding instructions to the reference device D1 and the target device D2.

At step S630, a first reference value from a reference device D1 as an execution result by the reference device D1 for a first node of the computation graph and a first target value from a target device D2 as an execution result by the target device D2 for the first node are received. At step S640, the first reference value and the first target value are compared and whether a comparison result meets a criterion is determined. In some embodiments, the comparison result can be a difference value between the first reference value and the first target value. In some embodiments, a first target value for a first node n1 is in error when the comparison result does not meet a criterion for determining an error. In some embodiments, a criterion for determining an error can be that a difference value as the comparison result is within a threshold value. For example, it can be determined that a first target value for a first node n1 is not erroneous (or correct) when the difference value is within a pre-set threshold value, and that the first target value for the first node n1 is in error (or not correct) when the difference value is bigger than the pre-set threshold value. It will be appreciated that a threshold value can have a value larger than "0" because computing devices can have different computation accuracy. It is understood that a threshold value can vary depending on embodiments of the present disclosure.

If it is determined that the comparison result does not satisfy a criterion at step S640, the process proceeds to step S650. At step S650, the decision can be notified to a system 300 or to a remote device such as a server. In some embodiments, the decision can be notified to a controller 311. In some embodiment, when the first target value for a first node n1 is determined in error, a first node execution of a target device D2 can be indicated that there is an error. If it is determined that the comparison result does satisfy a criterion at step S640, the process proceeds to step S660. In some embodiments, a controller 311 is configured to suspend the execution of the computation graph by the reference device D1 and the target device D2 during a time period from receiving the first reference value and first target value for a first node n1 to receiving a notification of the decision whether the first node n1 is in error or not. In some embodiments, a controller 311 is configured to determine timing of execution by the reference device D1 and target device D2.

At step S660, whether there is an unexecuted node in a computation graph is determined. If there is an unexecuted node in a computation graph, steps S620 to S660 are repeated. Consistent with embodiments of the present disclosure, execution of the computation graph by the reference device D1 and the target device D2 can be suspended until a decision about whether the first target value for a first node n1 is in error or not is made. For example, during the steps S630, S640, and, if applicable, S650, execution of the computation graph by the reference device D1 and the target device D2 can be suspended. In some embodiments, the reference device D1 and the target device D2 can resume executing a second node n2 of a computation graph as in step S620 after a decision about a first node n1 is made. Similarly, the error detection process can be performed for each node of a computation graph by repeating the steps S620 to S660 for rest of the nodes of the computation graph.

If there is no unexecuted node left in a computation graph at step S660, the process ends. In some embodiments, an error detection process may end at a pre-set node in a computation graph depending on a status of hardware accelerator development or on embodiments.

Embodiments herein include database systems, methods, and tangible non-transitory computer-readable media. The methods may be executed, for example, by at least one processor that receives instructions from a tangible non-transitory computer-readable storage medium. Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "computer-readable storage medium" should be understood to include tangible items and exclude carrier waves and transient signals.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The invention claimed is:

1. A method for detecting error in executing a computation graph on heterogeneous computing devices, the method comprising:
receiving a first reference value from a reference computing device included in the heterogeneous computing devices, the first reference value being an execution result by the reference computing device for a first node of the computation graph representing a machine learning model;
receiving a first target value from a target computing device included in the heterogeneous computing devices as an execution result by the target computing device for the first node;
comparing the first reference value and the first target value; and
determining whether the first target value is in error based on the comparison of the first reference value and the first target value.

2. The method of claim 1, wherein determining whether the first target value is in error comprises:
determining whether a difference value between the first reference value and the first target value is within a pre-set threshold value.

3. The method of claim 2, further comprising:
in response to the determination that the difference value between the first reference value and the first target value is not within the pre-set threshold value, classifying the first node corresponding to the target computing device as a node that has an error.

4. The method of claim 1, further comprising:
receiving a second reference value from the reference computing device as an execution result by the reference computing device for a second node of the computation graph;
receiving a second target value from the target computing device as an execution result by the target computing device for the second node, wherein the second target value is obtained by executing the second node using the first reference value as an execution result for the first node;
comparing the second reference value and the second target value; and
determining whether the second target value is in error based on the comparison between the second reference value and the second target value.

5. The method of any one of claim 1, further comprising:
generating a reference execution context for executing the computation graph on the reference computing device and a target execution context for executing the computation graph on the target computing device.

6. The method of claim 1, wherein:
after completion of execution of the first node, execution of the computation graph by the target computing device is suspended until the classification of the first node is completed.

7. The method of claim 6, wherein:
after the classification of the first node is completed, execution of the computation graph by the target computing device is resumed.

8. A system for detecting error in executing a computation graph on heterogeneous computing devices, the system comprising:
heterogeneous computing devices including a reference computing device and a target computing device each of which is configured to execute the computation graph representing a machine learning model; and
an error detection apparatus configured to:
receive a first reference value from the reference computing device as an execution result by the reference computing device for a first node of the computation graph;
receive a first target value from the target computing device as an execution result by the target computing device for the first node;
compare the first reference value and the first target value; and
determine whether the first target value is in error based on the comparison of the first reference value and the first target value.

9. The system of claim 8, wherein the error detection apparatus is configured to determine whether the first target value is in error by:
determining whether a difference value between the first reference value and the first target value is within a pre-set threshold value.

10. The system of claim 9, wherein the error detection apparatus is further configured to:
in response to the determination that the difference value between the first reference value and the first target value is not within the pre-set threshold value, classify the first node corresponding to the target computing device as a node that has an error.

11. The system of claim 8, wherein the error detection apparatus is further configured to:
receive a second reference value from the reference computing device as an execution result by the reference computing device for a second node of the computation graph;
receive a second target value from the target computing device as an execution result by the target computing device for the second node, wherein the second target value is obtained by executing the second node using the first reference value as an execution result for the first node;
compare the second reference value and the second target value; and
determine whether the second target value is in error based on the comparison between the second reference value and the second target value.

12. The system of claim 8, wherein the error detection apparatus is further configured to:
generate a reference execution context for executing the computation graph on the reference computing device and a target execution context for executing the computation graph on the target computing device.

13. The system of claim 8, wherein:
after completion of execution of the first node, execution of the computation graph by the target computing device is suspended until the classification of the first node is completed by the error detection apparatus.

14. The system of claim 13, wherein:
after the classification of the first node is completed by the error detection apparatus, execution of the computation graph by the target computing device is resumed.

15. A non-transitory computer readable medium that stores a set of instructions that is executable by at least one processor of a computing device to cause the computing device to perform a method for detecting error in executing a computation graph on heterogeneous computing devices, the method comprising:
receiving a first reference value from a reference computing device included in the heterogeneous computing devices, the first reference value being an execution result by the reference computing device for a first node of the computation graph representing a machine learning model;
receiving a first target value from a target computing device included in the heterogeneous computing devices as an execution result by the target computing device for the first node;
comparing the first reference value and the first target value; and
determining whether the first target value is in error based on the comparison of the first reference value and the first target value.

16. The computer readable medium of claim 15, wherein determining whether the first target value is in error comprises:
determining whether a difference value between the first reference value and the first target value is within a pre-set threshold value.

17. The computer readable medium of claim 16, further comprising:
in response to the determination that the difference value between the first reference value and the first target value is not within the pre-set threshold value, classifying the first node corresponding to the target computing device as a node that has an error.

18. The computer readable medium of claim 15, wherein the set of instructions that is executable by at least one processor of the computing device to cause the computing device to further perform:
receiving a second reference value from the reference computing device as an execution result by the reference computing device for a second node of the computation graph;
receiving a second target value from the target computing device as an execution result by the target computing device for the second node, wherein the second target value is obtained by executing the second node using the first reference value as an execution result for the first node;
comparing the second reference value and the second target value; and
determining whether the second target value is in error based on the comparison between the second reference value and the second target value.

19. The computer readable medium of claim 15, wherein the set of instructions that is executable by at least one processor of the computing device to cause the computing device to further perform:
generating a reference execution context for executing the computation graph on the reference computing device and a target execution context for executing the computation graph on the target computing device.

20. The computer readable medium of claim 15, wherein:
after completion of execution of the first node, execution of the computation graph by the target computing device is suspended until the classification of the first node is completed.

21. The computer readable medium of claim 20, wherein:
after the classification of the first node is completed, execution of the computation graph by the target computing device is resumed.

* * * * *